(12) United States Patent
Deryckere

(10) Patent No.: US 9,499,933 B2
(45) Date of Patent: Nov. 22, 2016

(54) DEVICE FOR SUPPORTING DOMESTIC APPLIANCES

(71) Applicant: Ludwig Georges Deryckere, Leksand (SE)

(72) Inventor: Ludwig Georges Deryckere, Leksand (SE)

(73) Assignee: ENER S.A., Luxembourg (BE)

( * ) Notice: Subject to any disclaimer, the term of this patent is extended or adjusted under 35 U.S.C. 154(b) by 0 days.

(21) Appl. No.: 14/390,589

(22) PCT Filed: Mar. 25, 2013

(86) PCT No.: PCT/BE2013/000015
§ 371 (c)(1),
(2) Date: Oct. 3, 2014

(87) PCT Pub. No.: WO2013/149309
PCT Pub. Date: Oct. 10, 2013

(65) Prior Publication Data
US 2015/0090859 A1  Apr. 2, 2015

(30) Foreign Application Priority Data

Apr. 3, 2012 (BE) .................................. 2012/0230

(51) Int. Cl.
| | | |
|---|---|---|
| *D06F 39/12* | (2006.01) | |
| *A47B 91/00* | (2006.01) | |
| *D06F 95/00* | (2006.01) | |
| *B62B 3/00* | (2006.01) | |
| *A47L 15/42* | (2006.01) | |
| *F16M 11/00* | (2006.01) | |
| *F16M 13/00* | (2006.01) | |
| *A47B 88/04* | (2006.01) | |

(52) U.S. Cl.
CPC ............ *D06F 39/125* (2013.01); *A47B 91/005* (2013.01); *A47L 15/4253* (2013.01); *B62B 3/005* (2013.01); *D06F 39/12* (2013.01); *D06F 95/00* (2013.01); *F16M 11/00* (2013.01); *F16M 13/00* (2013.01); *A47B 2088/0403* (2013.01)

(58) Field of Classification Search
CPC ...... D06F 39/125; D06F 39/12; D06F 95/00; A47B 91/005; A47B 2088/0403; B62B 3/005; A47L 15/4253
See application file for complete search history.

(56) References Cited

U.S. PATENT DOCUMENTS

| | | | | |
|---|---|---|---|---|
| 4,186,784 A | * | 2/1980 | Stone ..................... | B23D 49/08 |
| | | | | 108/28 |
| D275,044 S | * | 8/1984 | Hampshire ................... | D34/21 |
| 4,574,709 A | * | 3/1986 | Lackey .............. | A47B 87/0223 |
| | | | | 108/11 |

(Continued)

FOREIGN PATENT DOCUMENTS

| | | |
|---|---|---|
| DE | 19716825 A1 | 4/1998 |
| DE | 19832675 A1 | 1/2000 |

(Continued)

*Primary Examiner* — Eret McNichols
(74) *Attorney, Agent, or Firm* — Gable Gotwals

(57) ABSTRACT

A device (1) for supporting a domestic appliance and for bringing the appliance to a working height. The device being manufactured from a water-resistant material and including four legs (6) connected together such that the four legs (6) can be under the four corner points of a domestic appliance and having sufficient strength to bear the weight of a domestic appliance. The four legs (6) are connected together by a top panel (4) at the top and by a bottom panel (2) at the bottom.

6 Claims, 6 Drawing Sheets

(56) References Cited

U.S. PATENT DOCUMENTS

| | | | |
|---|---|---|---|
| 4,998,023 A * | 3/1991 | Kitts | B62B 3/02 211/188 |
| D361,188 S * | 8/1995 | Perelli | D34/17 |
| 5,722,544 A * | 3/1998 | Williams | A47B 87/0246 108/107 |
| 6,123,035 A * | 9/2000 | Pfister | A47B 87/0223 108/147.13 |
| 6,427,966 B1 * | 8/2002 | Blumenschein | A47B 91/005 248/646 |
| 6,585,225 B1 | 7/2003 | Lake | |
| 6,767,019 B2 * | 7/2004 | van Hekken | B62B 3/006 108/147.12 |
| 6,923,419 B2 * | 8/2005 | George | A47B 91/005 248/188.4 |
| 6,929,270 B1 | 8/2005 | Flagstad | B62B 5/0083 280/79.11 |
| 7,252,276 B2 * | 8/2007 | Acketts | A47B 91/005 248/188.8 |
| D569,065 S * | 5/2008 | Ritterling | D32/25 |
| D578,269 S * | 10/2008 | Van Landingham, Jr. | D34/17 |
| D618,419 S * | 6/2010 | Catron | D34/12 |
| 7,748,682 B2 * | 7/2010 | Hunke | D06F 39/12 248/346.5 |
| 7,806,426 B2 * | 10/2010 | Van Landingham, Jr. | B62B 3/02 280/47.35 |
| 7,810,782 B1 | 10/2010 | Driscoll | |
| 8,006,950 B2 * | 8/2011 | Harris | B82Y 10/00 248/636 |
| 8,028,548 B2 * | 10/2011 | Woo | D06F 39/10 68/12.13 |
| 8,075,071 B1 * | 12/2011 | Whittall | A47B 23/043 312/209 |
| D658,840 S * | 5/2012 | Nadeau | D34/12 |
| 8,215,245 B2 * | 7/2012 | Morrison | F16F 1/3732 108/91 |
| 8,550,274 B2 * | 10/2013 | Gerding | B65D 88/121 220/1.5 |
| 8,732,975 B2 * | 5/2014 | Rhodes | A47B 96/18 211/1 |
| 9,127,395 B2 * | 9/2015 | Kim | D06F 39/125 |
| 9,266,547 B2 * | 2/2016 | Schumaker | B62B 3/005 |
| 2003/0146180 A1 * | 8/2003 | Craft | A47B 87/0223 211/188 |
| 2004/0227315 A1 * | 11/2004 | Van Landingham, Jr. | A47B 31/00 280/47.35 |
| 2005/0023786 A1 * | 2/2005 | Delmerico | A47B 96/00 280/79.11 |
| 2005/0172678 A1 * | 8/2005 | Kim | A47B 91/005 68/3 R |
| 2007/0249212 A1 * | 10/2007 | Buecker | D06F 39/005 439/369 |
| 2007/0261612 A1 | 11/2007 | Alcov | |
| 2008/0149806 A1 * | 6/2008 | Yoon | D06F 39/125 248/638 |
| 2008/0302585 A1 * | 12/2008 | Perelli | B62B 3/008 180/14.1 |
| 2010/0237756 A1 | 9/2010 | Weinstein | |
| 2010/0283227 A1 * | 11/2010 | Perelli | B62B 3/008 280/639 |
| 2015/0145392 A1 * | 5/2015 | Khan | D06F 39/001 312/237 |

FOREIGN PATENT DOCUMENTS

| | | | | |
|---|---|---|---|---|
| DE | 20101249 U1 | 3/2001 | | |
| DE | 102005008438 A1 * | 9/2006 | | A47B 91/005 |
| DE | EP 2078781 A2 * | 7/2009 | | D06F 29/00 |
| DE | 102011054977 B4 * | 5/2013 | | D06F 39/125 |
| EP | 1621660 A2 * | 2/2006 | | A47B 91/005 |
| EP | 1679402 A2 | 7/2006 | | |
| KR | 20020085435 A | 11/2002 | | |
| KR | 100748526 B1 * | 8/2007 | | D06F 37/20 |
| KR | WO 2009134018 A2 * | 11/2009 | | D06F 29/00 |
| NL | 1033937 C1 | 9/2007 | | |

* cited by examiner

DEVICE FOR SUPPORTING DOMESTIC APPLIANCES

CROSS-REFERENCE TO RELATED APPLICATIONS

This application is the United States National Phase of PCT Patent Application No. BE2013/000015 filed on 25 Mar. 2013, which claims priority to Belgium Patent Application No. 2012/0230 filed 3 Apr. 2012, both of which are incorporated herein by reference.

The present invention relates to a device for supporting one of the domestic appliances: a washing machine, a drying machine or a dishwasher and bringing it to working height and for supporting and storing household accessories in the space released under one of these domestic appliances.

More specifically, the invention is intended to support washing machines, dryers, or dishwashers and to bring them to working height, and to support accessories that are used for the use of these domestic appliances.

It is known that domestic appliances such as washing machines, dryers or dishwashers are generally placed on the floor.

Traditionally a washing machine is placed on the floor, whereby a disadvantage of this arrangement is that the loader entry of the machine on the front is too low for the user, so that he must stoop whenever loading or unloading the laundry in the machine.

A laundry basket is frequently used for loading or emptying the washing machine, so that it must also be placed on the floor which does not make lifting any easier.

Traditionally a dryer is also placed on the floor.

Here too this arrangement is detrimental to the ergonomics of the user, as the loader entry is not at the most suitable height for the user, which is also frequently the case for the laundry basket into which or from which the laundry must be moved.

Another known example is the arrangement of a dishwasher on the floor, and frequently under the work surface in the kitchen. Again this arrangement is ergonomically detrimental as the user must always stoop to load or empty the machine, generally over a fold-down front panel, or to fill the machine with the necessary chemicals to wash the dishes.

The purpose of the present invention is to provide a solution to the aforementioned and other disadvantages by providing a device that is manufactured from a water-resistant material and which comprises four supporting points that are connected together such that the four supporting points can be under the four corner points of one of the above mentioned domestic appliances and whereby the supporting points have sufficient strength to bear the weight of one of the above mentioned domestic appliances, even when operating and wherein the four legs (6) are connected together by a top panel on their tops and by a bottom panel on their bottoms.

An advantage of such a device is that it can provide support for one of the above mentioned domestic appliances, whereby the appliance can be used in an ergonomically and easily accessible way.

DE 20.101.249 U1 describes a table shaped support for a washer or dryer with an extendable panel to support a laundry basket.

U.S. Pat. No. 6,585,225 B1 describes a support base for household appliances such as washers, dryers or refrigerators showing that molded plastic is strong enough to support such an appliance.

U.S. Pat. No. 7,810,782 B1 describes a support for a clothes cleaning device including top wall and a perimeter wall attached to and extending downwardly from the top wall, where the front wall has an access aperture and is free of a bottom edge, to access an area below the top wall.

KR 2002 0.085.435 A describes a bedplate for household appliances comprising a case which is equipped to receive drawers that move smoothly through rails and guide grooves.

An advantage of such a construction is that it strengthens the device so that it can better bear the weight of the domestic appliance.

Optionally the higher located top panel and/or the lower located bottom panel has a slide-out shelf or the slide-out mechanism can also serve to connect the supporting points together, both at the top of the legs that support the supporting points, and at the bottom of the legs that support the supporting points, whereby a top or bottom shelf is not necessary.

An advantage of such slide-out shelves is that they are ergonomically advantageous for supporting and, if need be, storing objects that are necessary for the use of the domestic appliance, such as in the case of a washing machine a laundry basket for laundry on the top slide-out shelf, and the necessary washing products for the washing machine on the bottom slide-out shelf.

Preferably the slide-out shelf of the bottom panel is operated with a pedal and the slide-out shelf of the top panel is operated with a handle.

An advantage of such an operation of the slide-out panels is that the slide-out shelf of the top panel can be pulled out by hand to place an object on it such as a laundry basket or other accessories, while the slide-out shelf of the bottom panel can be easily operated by foot, to bring the slide-out shelf of the bottom panel outwards or to let it spring back again, on which accessories such as washing products or chemicals are stored, and whereby this slide-out shelf, that also acts as a base for the device on which accessories can be stored, can also be retracted again.

An advantage of the above-mentioned operating methods is that they can be operated simultaneously by a user of the domestic appliance and that it ergonomically facilitates the operation of the domestic appliance and accessories.

Preferably the legs under the supporting points between the top and bottom panel are gripped in recesses in both panels without fasteners such as screws, wedges or other components.

An advantage of such recesses is that the legs and the top and bottom panels can be easily inserted in one another, without requiring special components or tools.

Another advantage of such recesses is that the number of components needed for the device can be limited, as the legs are identical to one another, and the top and bottom panel can be manufactured from the same components, which can reduce the production costs, especially if these components are made of plastic by injection moulding for example.

Thus the top panel and bottom panel can be identical, whereby the bottom panel is mounted the other way around with respect to the top shelf, such that the slide-out shelf of the top panel is on the underside of the panel and the slide-out shelf of the bottom panel is on the top side of the panel, which leads to a reduction of the production costs of the device, because the same component can be used as a top shelf and a bottom shelf.

The design enables the device to be easily transported and assembled, such that a deployment at many locations in a home is possible.

Preferably the dimensions of the device are chosen such that the width and depth of the device correspond to those of a standard domestic appliance, i.e. no more than 60 cm wide and no more than 65 cm deep.

An advantage of a device of such dimensions is that it can bring a number of types of domestic appliances to working height whose access, when they are on the ground, is at an ergonomically difficult place.

In addition to a washing machine the domestic appliance can also be a dryer, or a dishwasher.

The height of the legs of the device can preferably be set to the desired height by means of modular inserts.

This means that the length of the legs can be changed by sliding a modular insert between the two ends of a leg, whereby the height of the insert is chosen such that the desired height of the device is realised. Modular inserts can be provided in a limited but well thought-out number of sizes, whereby the greatest possible variety of adjustable heights can be obtained.

An advantage of this modular construction is that the height of the device, and thus the height of the domestic appliance placed on it, can be adjusted to the ergonomics or the physical height of the user.

It goes without saying that both the top and bottom slide-out shelf can be equipped with a handle or an operating pedal. Thus it can be advantageous for certain applications to equip both panels with an operating pedal, in case the hands of the user are not free.

With the intention of better showing the characteristics of the invention, a few embodiments of a device according to the invention are described hereinafter by way of an example, without any limiting nature, with reference to the accompanying drawings, wherein:

FIG. 1 schematically shows a perspective view of device according to the invention;

Figure 1:
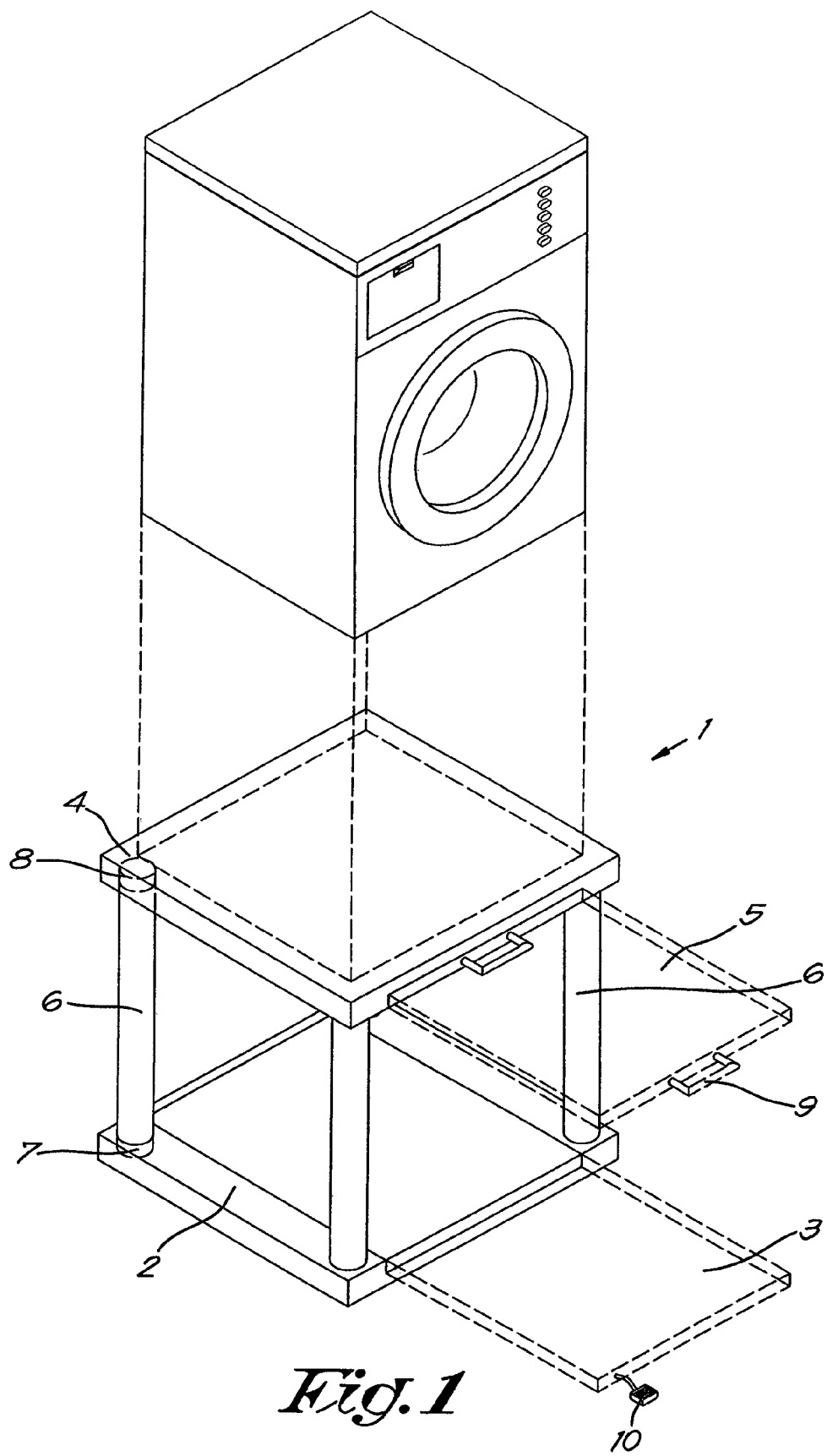

FIG. 1 shows a device 1 according to the invention, consisting of a bottom panel 2 with slide-out shelf 3 and a top panel with slide-out shelf 5, each connected together by four cylindrical legs 6, that each fit in a recess 7 of the bottom panel 2 at one end and their other end fits in a recess 8 of the top panel 4, whereby in this case the top slide-out shelf 5 is equipped with a handle 9, and the bottom slide-out shelf 5 is equipped with an operating pedal 10.

Figure 2:
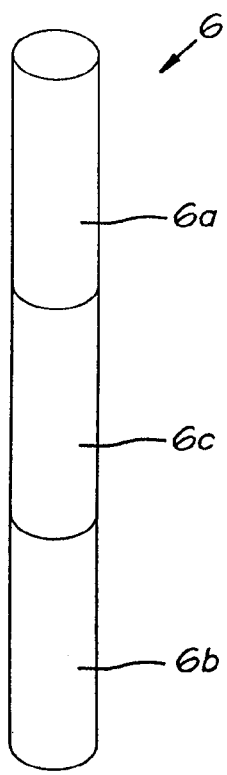
FIG. 2 shows a modularly constructed leg of the device according to FIG. 1.

FIG. 2 shows a cylindrical leg 6 of a device 1 according to the invention, constructed from 3 parts whereby the top 6a and the bottom component 6b are identical but in a reversed position, and whereby the middle component 6c is a modular piece that can be slid between the top 6a and the bottom 6b component to obtain the desired leg length of the leg 6.

Figure 3:
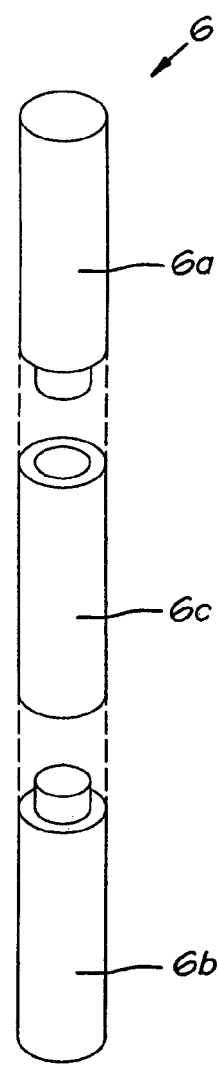
FIG. 3 shows an exploded view of FIG. 2.

FIG. 3 shows FIG. 2 but now in an exploded view in which it can be seen how the various components 6a, 6b, 6c of the leg 6 fit together.

Figure 4:
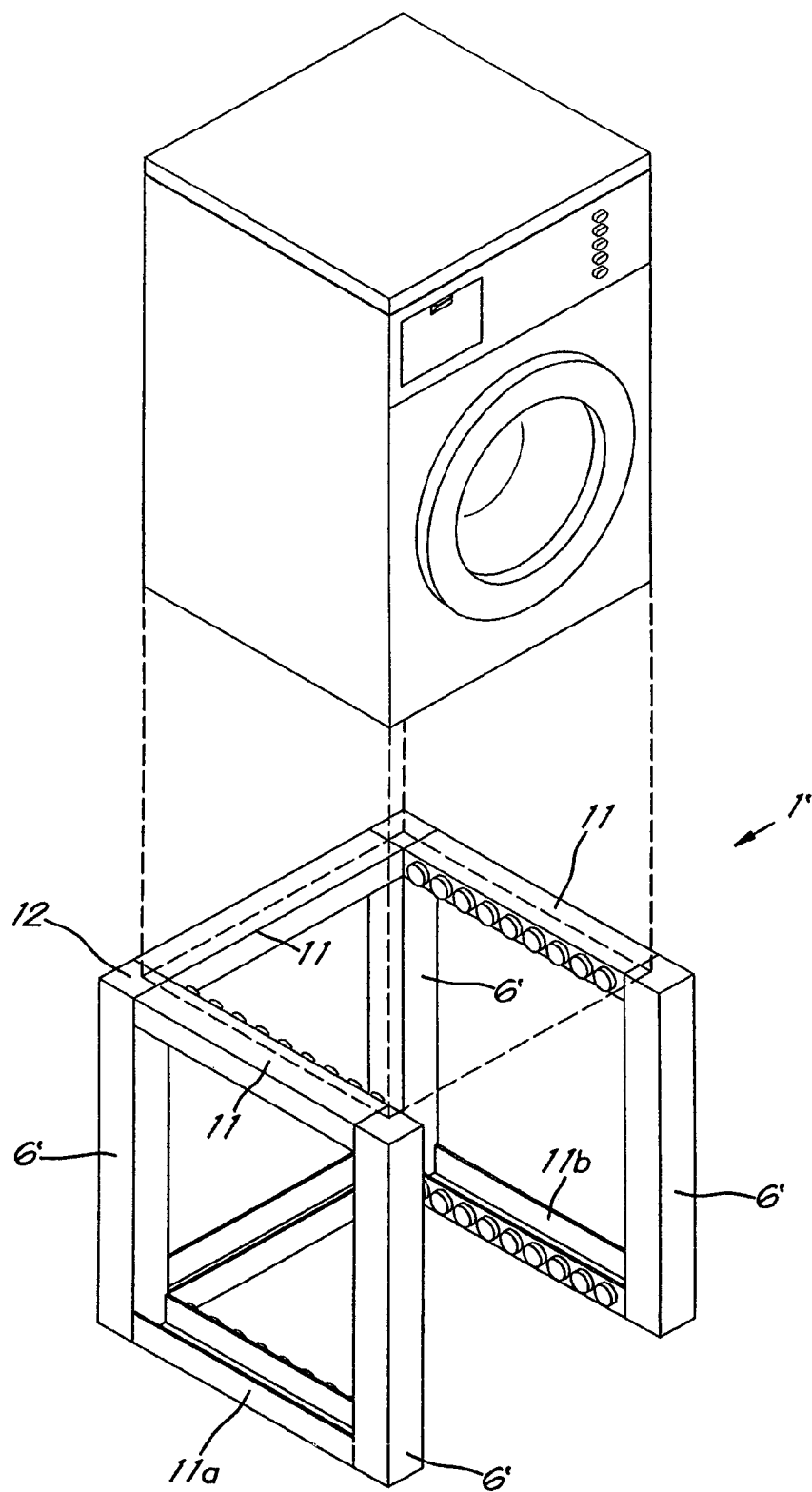
FIG. 4 shows a variant of FIG. 1.

FIG. 4 shows a variant 1' of FIG. 1 and whereby, in this case the legs 6' are not cylindrical but square, and the connection between the legs 6' is realised by means of U-shaped profiles 11 that are fastened to the square legs 6', whereby the U-shaped connection profiles that can connect the front two square legs have been omitted in this case to make the space under the domestic appliance more accessible, and optionally to enable a slide-out shelf. There is also no top panel to connect the legs at the top, but the domestic appliance rests directly on the four square legs 6' and the backs of the U-shaped profiles 11 that connect the tops of the legs 6' together.

Figure 5:
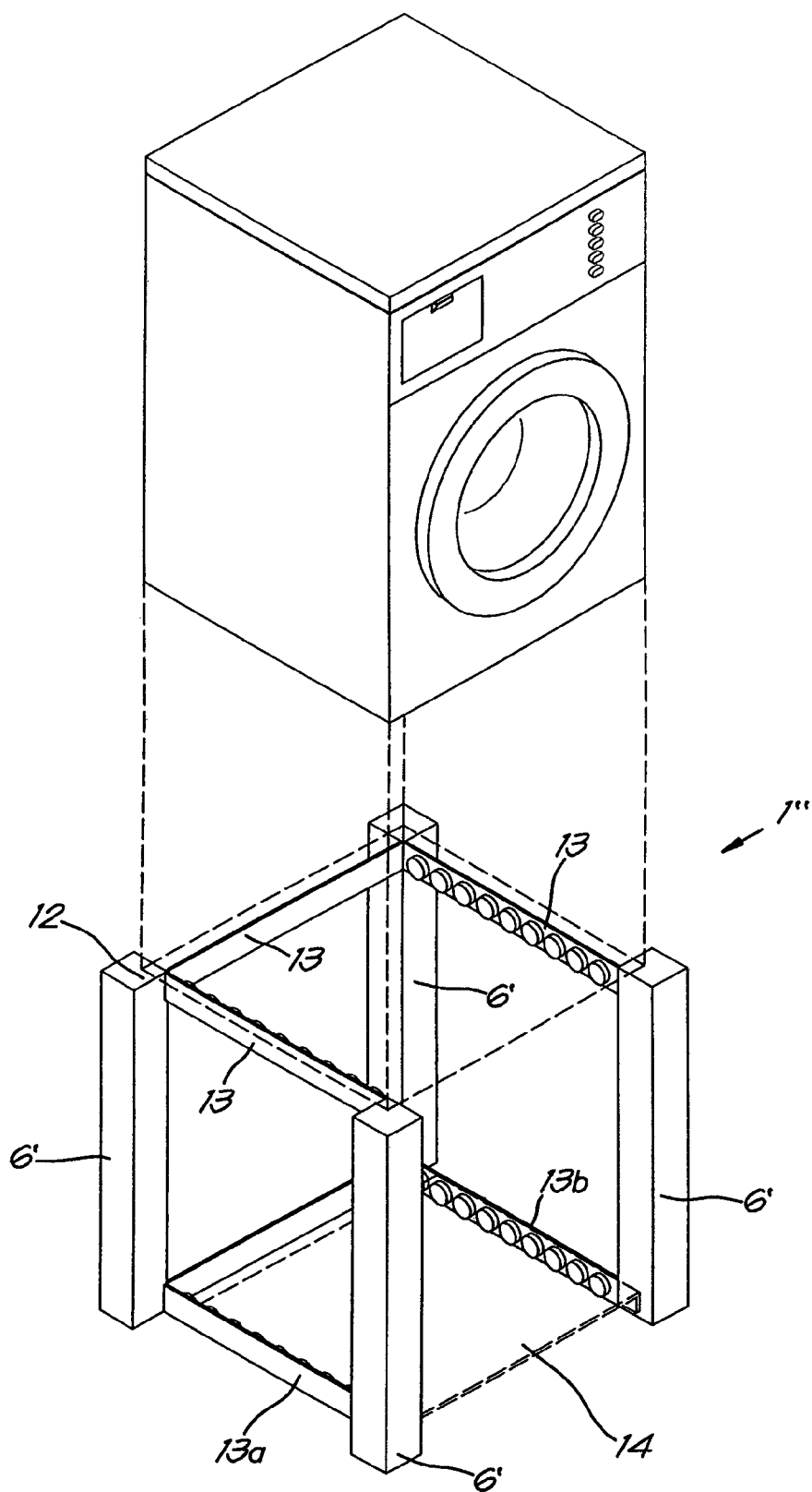
FIG. 5 shows another variant of FIG. 1.

FIG. 5 shows a variant 1'' of FIG. 1, whereby in this case the square legs 6' are connected together by means of slats 13, and whereby the slats that can connect the front two square legs are omitted. The domestic appliance rests directly on the four square legs 6' and the top edge of the slats 13 that connect the four legs 6' at the top.

Optionally a slide-out shelf 14 is provided between the bottom sections of the legs 6', whereby this shelf 14 can be suspended, in a way so that it rolls, on the U profiles 11a, 11b or connecting slats 13a, 13b that are between the bottom ends of the legs 6' between the front plane and back plane of the device 1' or 1''.

Figure 6:
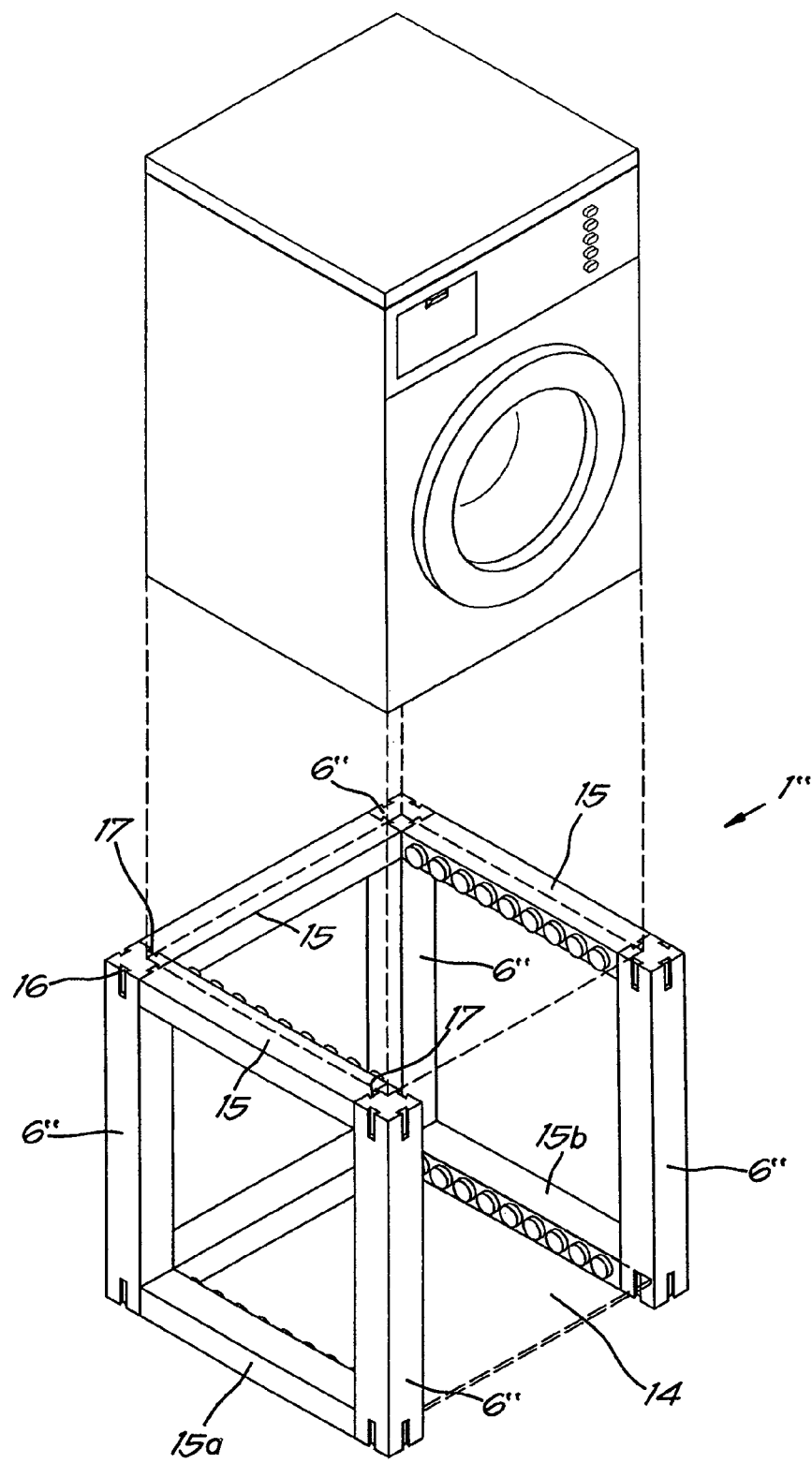
FIG. 6 shows yet another variant of FIG. 1.

In FIG. 6 a variant 1''' of FIG. 1 is represented, wherein in this case the square legs 6'' are linked to each other by means of connection profiles 15 and wherein the slats that can connect the two front square legs 6'' are omitted. The square legs are provided with slots 16 wherein dovetail shaped protrusions 17 fit that insure the bonding of the connection profiles to the legs. The household appliance rests directly on the four square legs 6'' and the top rim of the connection profiles 15 or slats that connect the four legs 6'' at the top side.

Optionally a slide-out shelf 14 can be provided between the bottom sections of the legs 6'', whereby this shelf 14 can be suspended in a rolling way on the connection profiles 15a, 15b or connection slats that are located between the bottom ends of the legs 6'' between the front face and the back face of the device 1'''.

Figure 7:
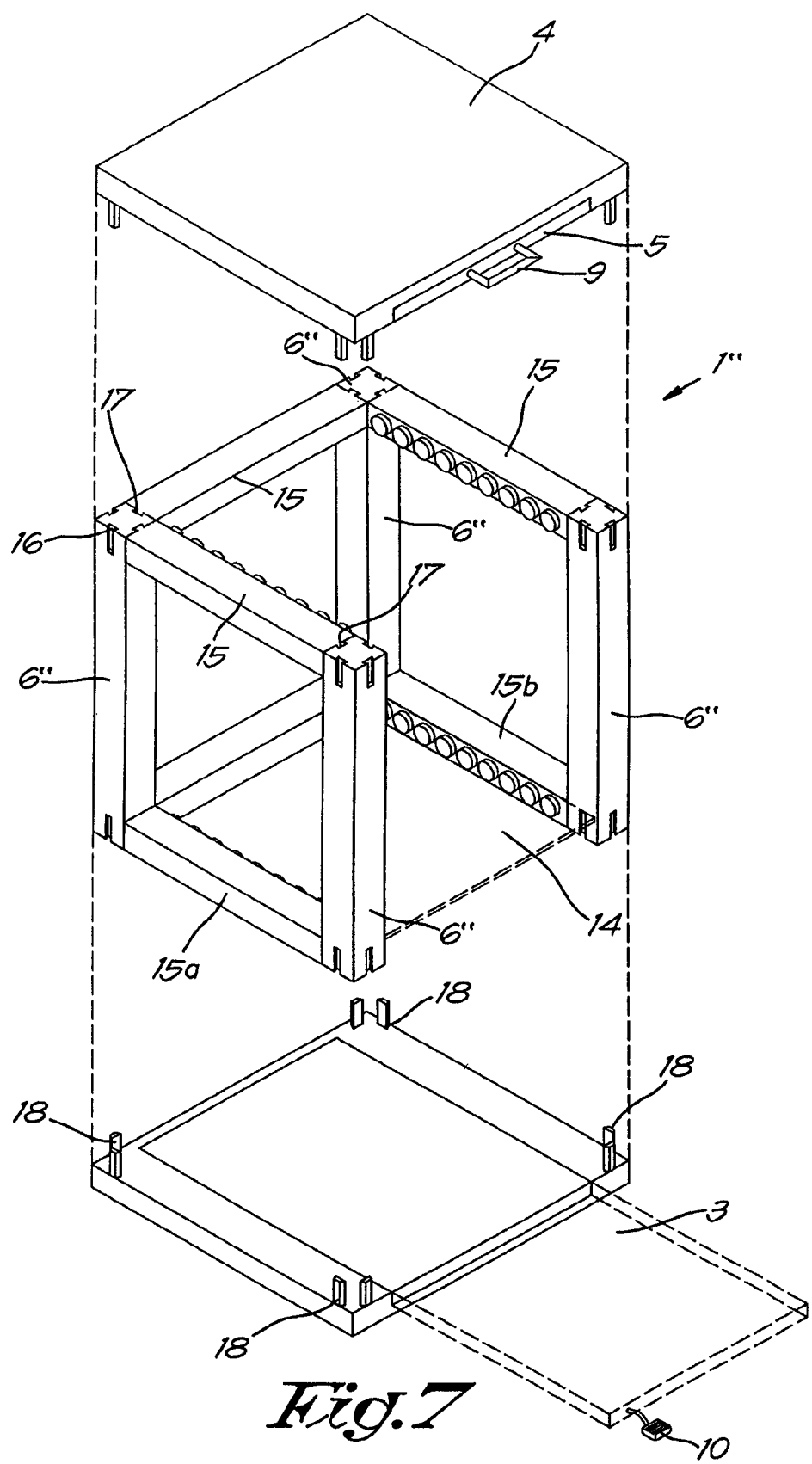
FIG. 7 shows FIG. 6 with a fitting top panel and bottom panel.

FIG. 7 shows an optional top panel and bottom panel provided with dovetail shaped protrusions 17 that fit into the slots 16 that insure the bonding of the top panel and bottom panel with the four legs 6''.

It goes without saying that the protrusions and the slots wherein they fit can also have a different shape than a dovetail shape, as long as they provide a good bonding of the parts and can be assembled without the need for tools.

Optionally the four legs can be replaced by two solid wall panels to the left and right 10 cm wide and of the desired height and depth (65 cm), that are each connected together by a top and/or bottom shelf or by a slide-out top and/or bottom shelf (not shown in the drawings).

The operation of the device 1 according to the invention is very simple and as follows.

The necessary components of the device 1 can be put on the market as a commercial kit, after which the components can be inserted together by the end user. This can be done without requiring special tools because the four legs 6 of the device can be slid, such that they grip, into the recesses 7 provided to this end in the bottom panel 2 and the top panel 4, after, if applicable, a modular insert 6c has been inserted between two end pieces 6a, 6b, whereby it must be ensured that the top panel 4 has its slide-out shelf 5 oriented downwards, while the bottom panel 2 has its slide-out shelf 3 oriented upwards. Finally, if necessary the accessories such as the handle 9 and operating pedal 10 must be fitted, if they have not already been done so in the kit supplied.

Then the domestic appliance must be placed on the device and any necessary utility connections for the domestic appliance must be made.

The slide-out shelf 5 of the top panel 4 can be used to place objects that are needed at the level of the access to the domestic appliance, in this case for example a laundry basket for the laundry that must be put in the washing machine or taken out of it.

After use, the slide-out shelf 5 of the top panel can be slid back again so that the space in front of the domestic appliance is free again.

Alternatively the slide-out shelf 3 of the bottom panel 2 can be moved forward by a mechanism operated by an operating pedal 10, so that objects that are needed for the domestic appliance, and which are on this slide-out shelf 3 of the bottom panel, can be taken to the outside, in this case for example washing products or additives that are required to fill the washing machine.

After use the slide-out shelf 3 of the bottom panel 2 can be slid back again, by again pressing on the operating pedal 10, so that the space in front of the domestic appliance is clear again.

The present invention is by no means limited to the embodiments described as an example and shown in the drawings, but a device for supporting domestic appliances and bringing them to working height according to the invention, as described in the claims, can be realised in all kinds of variants, without departing from the scope of the invention.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. Device (1) for supporting a washing machine, a drying machine or a dishwasher and bringing such to a working height, the device being manufactured from a water-resistant material and comprising four legs (6), that are connected together such that the four legs (6) can be under the four corner points of one of the aforementioned domestic appliances and whereby the legs (6) have sufficient strength to bear the weight of the domestic appliance, characterised in that the four legs (6) are connected together by a top panel (4) on their top and by a bottom panel (2) on their bottom, and the top panel (4) and the lower bottom panel (2) are identical and each has a slide-out shelf (3, 5), the bottom panel is mounted in reversed position with respect to the top shelf, such that the slide-out shelf of the bottom panel is on a top side of the bottom panel and the slide-out shelf of the top panel is at a bottom side of the top panel.

2. Device according to claim 1, characterised in that the water-resistant material from which the device (1) is manufactured is selected from the group consisting of water-resistant plastic and a rust-free metal.

3. Device according to claim 1, characterised in that the slide-out shelf (3) of the bottom panel (2) is operated with a pedal (10).

4. Device according to claim 1, characterised in that the slide-out shelf (5) of the top panel (4) is operated by a handle (9).

5. Device according to claim 1, characterised in that the legs (6) between the top (4) and bottom panel (2) are gripped in recesses (7) in these panels.

6. Device according to claim 1, characterised in that the width is limited to no more than 60 cm and the depth is limited to no more than 65 cm, and the height of the legs (6) can be adjusted to the desired height by modular inserts (6c).

* * * * *